Dec. 12, 1933.    G. R. WOOD    1,939,030
MICROMETER
Filed May 14, 1931
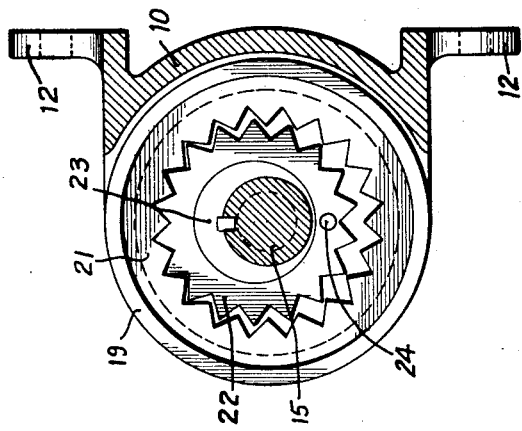
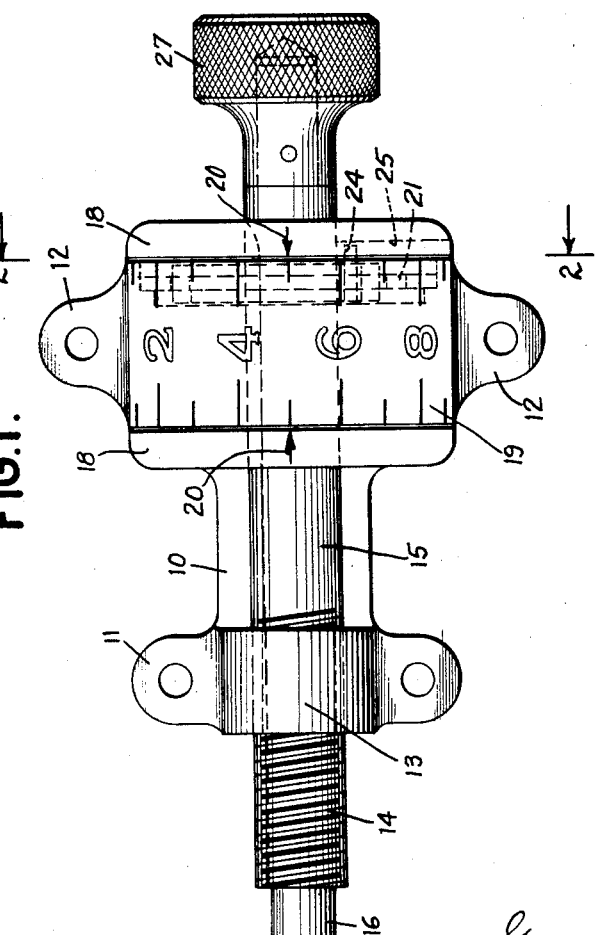
INVENTOR
George R. Wood
BY his ATTORNEY Patented Dec. 12, 1933

1,939,030

UNITED STATES PATENT OFFICE 1,939,030

MICROMETER

George R. Wood, Toronto, Ontario, Canada, assignor, by mesne assignments, to International Business Machines Corporation, New York, N. Y., a corporation of New York Application May 14, 1931. Serial No. 537,313

4 Claims. (Cl. 33—170)

This case relates to gage indicating and setting mechanism.

The object of the invention is to provide novel means for operating an indicator upon the setting of a gage to indicate the relative position of the gage.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the drawing:

Fig. 1 is a front view of the device and

Fig. 2 is a section on line 2—2 of Fig. 1.

In detail, the device comprises a bracket 10 having integral ears 11 and 12 with openings to receive fastening means for attaching the bracket to a support. Between ears 11, the bracket is formed with a circular lug 13 having an internally threaded opening to cooperate with the threaded portion 14 of a shaft 15. The forward portion of shaft 15 has a reduced end forming a stop 16 adapted to limit movement of a member (not shown). The rear portion of shaft 15 is freely journaled in axial openings of similar spaced circular lugs 18. Between lugs 18 is an indicator wheel 19 freely mounted on shaft 15 and having graduations coacting with index marks 20 to indicate the position of stop 16. Indicator wheel 19 has rigidly set therein at one side, an internal gear 21 with twenty teeth. Within gear 21 is a gear 22 having eighteen teeth. Gear 22 freely embraces an eccentric sleeve 23 keyed to shaft 15. Gear 22 has extending from one side a pin 24 movable within a vertical slot 25 in the right hand lug 18.

The operation of the above parts is as follows: The shaft 15 is manually rotated by means of a knob 27 fixed to its right hand end. Rotation of shaft 15 rotates eccentric sleeve 23. As the sleeve rotates, it causes oscillation of the gear 22 mounted thereon. The oscillation is such that the axis of gear 22 revolves about the center of the shaft 15. At its lower end, gear 22 moves substantially vertically as determined by pin 24 sliding along vertical slot 25. The other parts of the gear 22 partake of this vertical movement and also oscillate horizontally about pin 24 as a pivot.

Assume that the parts are in the position shown in Fig. 2 and shaft 15 is rotated clockwise as viewed in Fig. 2. As the high portion of eccentric sleeve 23 moves to the right, it forces gear 22 downwardly and to the right, thereby gradually demeshing the upper teeth of gear 22 from gear 21. As the teeth demesh, they are moving to the right, thus camming gear 21 to the right. When the eccentric has moved clockwise 90°, the teeth at the right side of the gear 22 have been forced into mesh with adjacent teeth of gear 21 and in so doing cam the latter clockwise. When sleeve 23 has moved 180°, gear 22 has moved to its lower limit, and the lower teeth enter into mesh with gear 21, camming the gear clockwise while so doing.

Thus as the higher point of sleeve 23 moves about the shaft 15 the teeth of gear 22 successively mesh with the teeth of gear 21, camming the latter in the same direction as the shaft.

Gears 21 and 22 constitute an epicyclic train since the axis of gear 22 revolves about the shaft 15 while gear 21 rotates relative to gear 22. The movement of gear 21 may be derived by the simple formula for epicyclic trains;

$$R_1 = 1 - r$$

where $r = \dfrac{\text{number of teeth in second gear}}{\text{number of teeth in first gear}}$ Substituting the values of the present case for 1 revolution of sleeve 23.

$R_1$=Rotations of gear 21=1—18/20 or 1/10

Thus for every rotation of shaft 15, gear 21 makes 1/10 rotation or moves the distance of two teeth.

The pitch of the threads of portion 14 is such that each rotation of shaft 15 advances the stop 16 one-sixteenth of an inch. This advance of one-sixteenth of an inch is indicated by the space between successive graduation marks on indicator barrel 19. In this manner, the barrel furnishes a magnified indication of the setting of stop 16. At the same time, the micrometer setting of stop 16 may be easily effected by a comparatively gross manipulation of shaft 15. The pitch of threaded portion 14 may be made very small and the adjustment of stop 16 very fine because the indicator is not rigidly carried on the shaft 15 and movement of the indicator is not equal to that of the shaft. If it were, one rotation of shaft 15 would move the indicator through its entire range and consequently the total adjustment of the stop would have to be effected in only one rotation of the shaft.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In a device of the class described, a threaded shaft provided with a stop, a frame in which the shaft is rotatable and having a threaded portion coacting with the threaded portion of the shaft, an indicator for indicating the setting of the stop, and means for operating the indicator comprising a single external gear surrounding said shaft, and means operated by the aforesaid shaft for operating the external gear and an internal gear associated with the indicator and operated by the external gear.

2. In a device of the class described, a frame, an indicator and means for operating the indicator comprising a shaft about which the indicator is rotatable, said shaft and frame having coacting threaded engagement to advance the shaft when rotated, a gage element advanced by the movement of said shaft, an internal gear rigid with the indicator, an external gear surrounded by the internal gear and means operated by the rotation and advance of the shaft for moving the external gear in an eccentric path to rotate the internal gear and indicator and advance the gage element, said indicator indicating the setting of said gage element.

3. In combination, a shaft provided with a stop, an indicator rotatable about the shaft for indicating the setting of the stop, an internal gear rigid with the indicator, an external gear meshed with the internal gear and the axis of which is rotatable about the axis of aforesaid shaft, and means on the shaft for rotating the axis of the external gear about the axis of said shaft, said rotation effecting driving of the internal gear by the external gear.

4. A gage mechanism comprising a pair of intermeshing gears, one of said gears being internal, the other gear being external and surrounded by the internal gear, a shaft, a frame for movably guiding and carrying the latter, an eccentric sleeve on the shaft on which the external gear is freely mounted, a pivot for the external gear, and a guide rigidly provided on said frame along which the pivot is slidable, operation of the shaft causing the eccentric sleeve to oscillate the axis of the external gear about the axis of the shaft an indicator ring surrounding the shaft, and a driving connection between the indicator ring and the external gear for moving the indicator ring one step for each complete cycle of oscillation of the external gear.

GEORGE R. WOOD.